United States Patent
Matsui et al.

(10) Patent No.: US 6,556,790 B2
(45) Date of Patent: Apr. 29, 2003

(54) ELECTRONIC FLASH DEVICE

(75) Inventors: Hideki Matsui, Tokyo (JP); Zhaoxiang Chen, Tokyo (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 10/058,310

(22) Filed: Jan. 30, 2002

(65) Prior Publication Data
US 2003/0039475 A1 Feb. 27, 2003

(30) Foreign Application Priority Data
Aug. 27, 2001 (JP) ........................................ 2001-256227

(51) Int. Cl.⁷ .............................................. G03B 15/05
(52) U.S. Cl. ........................ 396/156; 396/159; 396/205
(58) Field of Search ............................... 396/156, 205, 396/206, 159–163; 315/241 P

(56) References Cited

U.S. PATENT DOCUMENTS

| | | | |
|---|---|---|---|
| RE35,196 E | * 4/1996 | Iwamoto et al. | ............ 396/159 |
| 5,990,631 A | * 11/1999 | Hioki et al. | ............ 396/205 X |
| 6,009,281 A | * 12/1999 | Hosomizu et al. | .......... 396/156 |

FOREIGN PATENT DOCUMENTS

| | | | |
|---|---|---|---|
| JP | A 64-17033 | 1/1989 | ........... G03B/15/05 |
| JP | A 4-27164 | 1/1992 | ........... H01L/29/68 |
| JP | U 5-84947 | 11/1993 | ........... G03B/15/05 |

* cited by examiner

Primary Examiner—W. B. Perkey
(74) Attorney, Agent, or Firm—Oliff & Berridge PLC

(57) ABSTRACT

An electronic flash device includes: a flash light emission circuit that performs a flash light emission; a light emission control circuit that supplies power for light emission to the flash light emission circuit in response to an input of a light emission start signal and cuts off the power to the flash light emission circuit in response to an input of a light emission stop signal; and a protective circuit that detects a state that will induce power supply to the flash light emission circuit in response to an anomalous signal based upon a circuit operation of the light emission control circuit and prevents the power supply to the flash light emission circuit.

14 Claims, 3 Drawing Sheets

ELECTRONIC FLASH DEVICE

INCORPORATION BY REFERENCE

The disclosure of the following priority application is herein incorporated by reference: Japanese Patent Application No. 2001-256227 filed Aug. 27, 2001.

BACKGROUND OF THE INVENTION

1. Field of the Invention

The present invention relates to an electronic flash device that emits flash light in synchronization with a camera photographing operation.

2. Description of the Related Art

There are electronic flash devices known in the related art that implement light emission control by connecting a drive element such as an IGBT (insulated gate bipolar transistor) in series with a light emitting tube (see Japanese Laid-Open Patent Publication No. S64-17033 and Japanese Laid-Open Patent Publication No. H4-27164, for instance). This type of electronic flash device implements on/off control of the drive element so as to radiate the correct quantity of light onto the subject.

When there are several coexisting conditions, such as 1) the distance to the subject is small, 2) the reflectance of the subject is high, 3) the image-capturing sensitivity at the camera is high and 4) the photographic F value of the lens is set for bright light, the quantity of light irradiated on the subject immediately reaches the correct level after the light emission starts. In such a case, the drive element is switched to an OFF operation immediately after the drive element is turned on.

The maximum rated value of the collector current in a drive element such as an IGBT is normally determined in correspondence to the gate voltage. FIG. 3 illustrates the relationship between the gate voltage and the maximum rated collector current.

When the drive element is set to engage in an OFF operation immediately after it is turned on, as described above, the gate voltage of the drive element does not fully rise and instead, its level shifts in a relatively low voltage range slightly above the ON voltage. When the gate voltage is low, the maximum rated value for the collector current, too, stays at a low level as shown in FIG. 3.

The light emitting tube, on the other hand, is in an excited state immediately after the start of light emission in response to the ON operation of the drive element, and thus, the impedance within the tube is extremely low. In addition, a high voltage is applied to the two ends of the light emitting tube at the light emission start.

For these reasons, if the drive element shifts to an OFF operation immediately after light emission start, a large collector current is allowed to flow to the drive element despite a low maximum rated collector current level.

If the collector current of the drive element exceeds the maximum rated collector current even momentarily under those circumstances, problems arise, such as 1) the characteristics of the drive element deteriorate, 2) the service life of the drive element is reduced and 3) in the worst case scenario, the drive element breaks down, disabling light emission by the electronic flash device.

Accordingly, the applicant of the present invention disclosed in Japanese Laid-Open Utility Model publication No. H5-84947 an electronic flash device having a means for invalidating a light emission stop signal over a predetermined length of time after a light emission start signal is output and a means for invalidating the light emission start signal over a predetermined length of time after the light emission stop signal is output.

In the structure proposed in the related art, the light emission stop signal is invalidated over a predetermined length of time following an output of the light emission start signal. As a result, it is possible to avoid a state in which the maximum rated value is exceeded at the drive element as described above with a high degree of reliability, and a breakdown of the drive element and the like can be prevented.

Static electricity is generated in a dry environment during the winter, for instance. If a discharge pulse attributable to such static electricity should be applied to a circuit of an electronic flash device, the drive element may enter an electrically continuous state without an input of the light emission start signal, and start light emission.

Since the potential of such static electricity is extremely unstable, the switching operation at the drive element cannot be stabilized readily and thus, light emission may stop immediately after the start of the light emission. In such a situation, too, the current at the drive element may momentarily exceed the maximum rated value, which poses a concern for a breakdown of the drive element and the like.

In addition, there is another concern that the discharge pulse caused by the static electricity may be applied at a plurality of locations within. the circuits of the electronic flash device to allow a light emission start sequence and a light emission stop sequence to take place with a very small time lag in the circuit. In this case, too, the light emission may be stopped immediately after the light emission start, posing a concern for a breakdown of the drive element and the like.

In the device proposed in the related art (Japanese Laid-Open Utility Model Publication No. H 5-84947), the light emission stop signal is invalidated in response to an input of the light emission start signal. For this reason, it is difficult to fully address the problems caused by static electricity or the like (i.e., without an input of the light emission start signal) as described above.

SUMMARY OF THE INVENTION

An object of the present invention is to provide an electronic flash device capable of preventing a breakdown caused by an anomalous signal such as static electricity.

In order to attain the above object, an electronic flash device according to the present invention comprises: a flash light emission circuit that performs a flash light emission; a light emission control circuit that supplies power for light emission to the flash light emission circuit in response to an input of a light emission start signal and cuts off the power to the flash light emission circuit in response to an input of a light emission stop signal; and a protective circuit that detects a state that will induce power supply to the flash light emission circuit in response to an anomalous signal based upon a circuit operation of the light emission control circuit and prevents the power supply to the flash light emission circuit.

Another electronic flash device according to the present invention comprises: a flash light emission circuit that performs a flash light emission; a light emission control circuit that supplies power for light emission to the flash light emission circuit in response to an input of a light emission start signal and cuts off the power to the flash light emission circuit in response to an input of a light emission stop signal; and a protective circuit that detects a state that will induce power supply to the flash light emission circuit without an input of the light emission start signal based upon a circuit operation of the light emission control circuit and prevents the power supply to the flash light emission circuit.

In this electronic flash device, it is preferred that: the light emission control circuit includes at least a first switching element that turns on/off the power supply to the flash light emission circuit, a second switching element that outputs an ON signal for turning on the first switching element in response to an input of the light emission start signal and a third switching element that outputs an OFF signal for turning off the first switching element in response to the light emission stop signal; and the protective circuit prevents the first switching element from becoming turned on in response to the ON signal if the ON signal from the second switching element is detected while there is no input of the light emission start signal.

Another electronic flash device according to the present invention comprises: a flash light emission circuit that performs a flash light emission; a light emission control circuit that supplies power for light emission to the flash light emission circuit in response to an input of a light emission start signal and cuts off the power to the flash light emission circuit in response to an input of a light emission stop signal; and a protective circuit that detects a state that induces power supply to the flash light emission circuit in response to an anomalous signal based upon a circuit operation of the light emission control circuit and prevents a power supply cutoff to the flash light emission circuit.

Another electronic flash device according to the present invention comprises: a flash light emission circuit that performs a flash light emission; a light emission control circuit that supplies power for light emission to the flash light emission circuit in response to an input of a light emission start signal and cuts off the power to the flash light emission circuit in response to an input of a light emission stop signal; and a protective circuit that detects a state that induces power supply to the flash light emission circuit without an input of the light emission start signal based upon a circuit operation of the light emission control circuit and prevents cutoff of power supply to the flash light emission circuit.

In this electronic flash device, it is preferred that: the light emission control circuit includes at least a first switching element that turns on/off power supply to the flash light emission circuit and a second switching element that outputs an ON signal for turning on the first switching element in response to an input of the light emission start signal and outputs an OFF signal for turning off the first switching element in response to the light emission stop signal; and the protective circuit prevents the OFF signal from becoming output from the second switching element even if the light emission stop signal is input while the ON signal is output from the second switching element without an input of the light emission start signal. In this case, it is preferred that: the protective circuit includes a capacitor which is charged with the light emission start signal so as to detect an input of the light emission start signal.

Also, it is preferred that: the light emission control circuit includes at least a first switching element that turns on/off power supply to the flash light emission circuit and a second switching element that outputs an ON signal for turning on the first switching element in response to an input of the light emission start signal and outputs an OFF signal for turning off the first switching element in response to the light emission stop signal; and the protective circuit prevents the first switching element from becoming turned off if the ON signal from second switching element is detected while there is no input of the light emission start signal. In this case, it is preferred that: the light emission control circuit further includes a third switching element that turns off the first switching element regardless of whether the ON signal or the OFF signal is output from the second switching element when there has been an input of the light emission stop signal; and the protective circuit prevents the first switching element from becoming turned off by the third switching element regardless of whether or not there has been an input of the light emission stop signal if the ON signal is detected from the second switching element while there is no input of the light emission start signal. Furthermore, it is preferred that: the protective circuit includes a capacitor which is charged with the light emission start signal so as to detect an input of the light emission start signal.

In the above electronic flash devices, it is preferred that the protective circuit includes a speedup capacitor for hastening timing with which power supply prevention is started.

DESCRIPTION OF THE PREFERRED EMBODIMENTS

The following is an explanation of the embodiments achieved in the present invention, given in reference to the drawings.

First Embodiment

Figure 1:
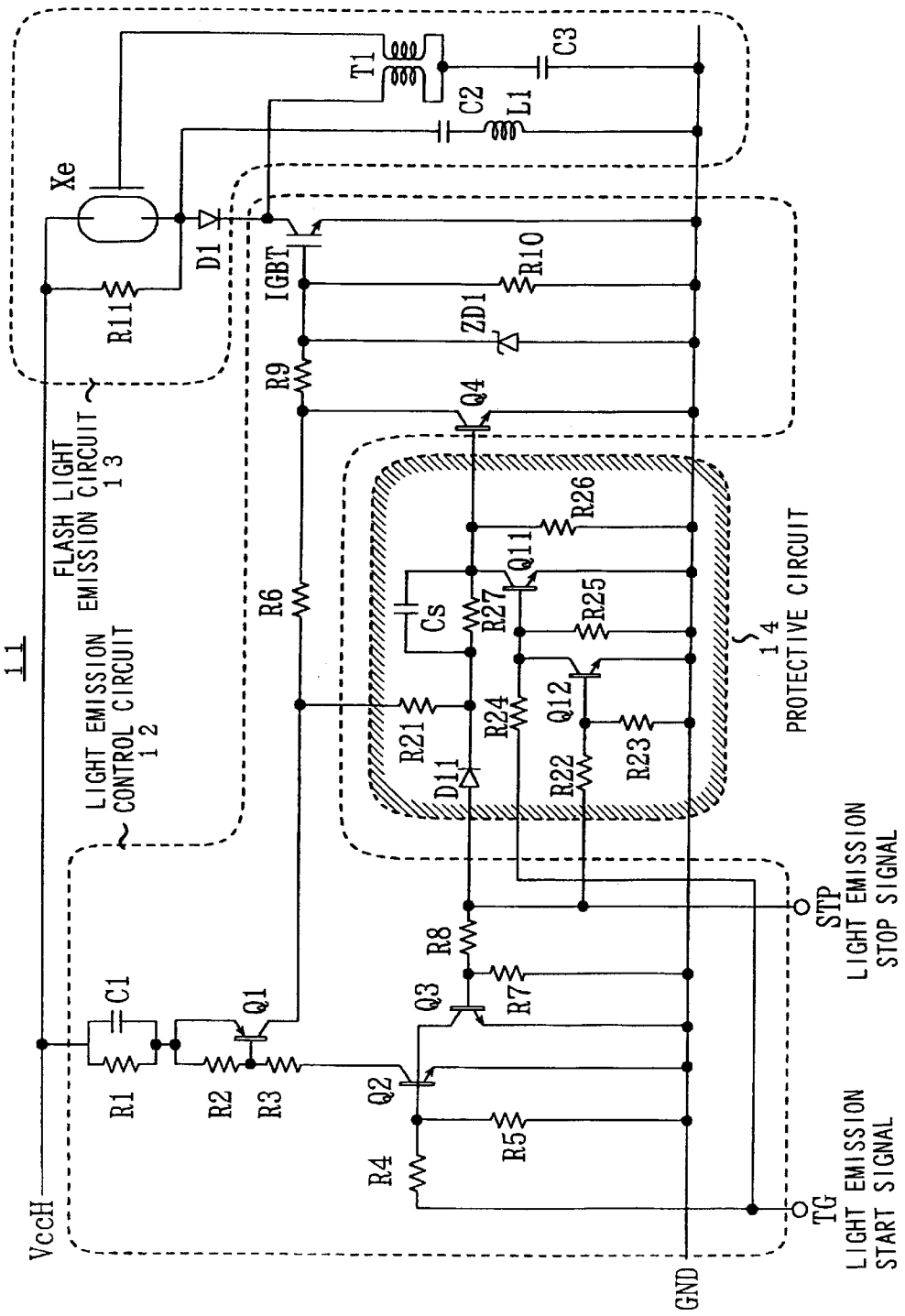
FIG. 1 illustrates the main circuits in the electronic flash device 11.

FIG. 1 shows the main circuits in an electronic flash device 11. The electronic flash device 11 in FIG. 1 comprises a light emission control circuit 12, a flash light emission circuit 13 and a protective circuit 14.

The light emission control circuit 12 includes transistors Q1~Q4, a drive element IGBT, a Zenner diode ZD1, resistors R1~R10 and a capacitor C1. The flash light emission circuit 13 includes a light emitting tube Xe, a diode D1, a resistor R11, a trigger transformer T1, and inductor L1 and capacitors C2~C3. The protective circuit 14 is constituted of transistors Q11~Q12, a diode D11, resistors R21~R27 and a speedup capacitor Cs. The operations performed by the electronic flash device 11 in a normal situation and in an anomalous or abnormal situation are now individually explained.

Operation Performed Under Normal Circumstances

The operation of the electronic flash device 11 performed under normal circumstances is now explained. A light emission start signal TG input from a camera or the like turns on the transistor Q2 via the resistor R4. Interlocking with the ON operation of the transistor Q2, the transistor Q1 is turned on and most of a voltage VccH at a source line is output to the collector of the transistor Q1.

The protective circuit 14 detects light emission start signal TG via the resistor R24 and turns on the transistor Q11. As a result, the base of the transistor Q4 becomes grounded, thereby allowing the transistor Q4 to sustain an OFF state. In this state, the collector voltage at the transistor Q1 is transmitted to the gate of the drive element IGBT via the resistor R6 and the resistor R9 without interference from the transistor Q4 which is in an OFF state.

The gate voltage at the drive element IGBT is raised by the collector voltage at the transistor Q1 and its level is controlled at a level equal to that of the Zenner voltage at the Zenner diode ZD1. This Zenner voltage achieves an optimal voltage level for sustaining an ON state at the drive element IGBT in a stable manner. As the drive element IGBT is turned on by such a gate voltage, the charge voltage (VccH) at the capacitor C2 is discharged through a closed loop constituted of the diode D1, the drive element IGBT and the inductor L1. At this time, an LC resonance occurs within the closed loop. As a result, the voltage on the anode side of the diode D1 is lowered to a level approximately equal to −VccH after a specific resonance cycle. The moment the voltage is lowered to this level, a voltage which is approximately twice as high as VccH is applied to the two ends of the light emitting tube Xe.

As the drive element IGBT is turned on, the voltage charged at the capacitor C3 is discharged through the primary side of the trigger transformer T1 and through the drive element IGBT. At this time, a trigger voltage of several thousand volts is momentarily induced on the secondary side of the trigger transformer T1. This trigger voltage is applied to a trigger terminal of the light emitting tube Xe, thereby exciting the gas inside the light emitting tube Xe. As a result, the impedance inside the tube is rapidly lowered.

In this state, a discharge starts within the light emitting tube Xe and thus the light emitting tube Xe starts light emission. After the light emission starts in this manner, a light sensor circuit (not shown) on the camera side or on the electronic flash device 11 executes a photosensing operation. A light emission stop signal STP is output from this photo sensor circuit at a point in time at which the quantity of light irradiated onto the subject reaches the correct level. In response to the output of the light emission stop signal STP, the light emission start signal TG is turned off. When a predetermined length of time has elapsed subsequently, the light emission stop signal STP, too, is turned off.

The light emission stop signal STP turns on the transistor Q3 via the resistor R8. In response, the base voltage at the transistor Q2 is lowered to the level of the ground potential and thus, the transistor Q2 and the transistor Q1 are forcibly turned off. In the addition, the light emission stop signal STP turns on the transistor Q12 via the resistor R22. As a result, the base voltage at the transistor Q11 is lowered to the level of the ground potential, thereby forcibly turning off the transistor Q11.

In this state, the light emission stop signal STP is provided to the base of the transistor Q4 via the diode D11 and the speedup capacitor Cs without interference from the transistor Q11 which is in an OFF state. Thus, the transistor Q4 becomes turned on and the gate voltage at the drive element IGBT is lowered to the level of the ground potential. Consequently, the drive element IGBT is turned off, thereby stopping the flash light emission by the light emitting tube Xe.

Operation Performed Under Anomalous Circumstances

Now, the circuit operation executed when the transistor Q1 is turned on by an anomalous signal without an input of the light emission start signal TG is explained. A voltage at a level approximately equal to VccH is output to the collector of the transistor Q1 in an ON state.

If there was no protective circuit 14, this collector voltage would be directly transmitted to the gate of the drive element IGBT via the resistors R6 and R9. As a result, the drive element IGBT would be turned on to induce an erroneous light emission. However, the protective circuit 14 promptly detects the increase in the collector voltage at the transistor Q1 via the resistor R21 and the speedup capacitor Cs and turns on the transistor Q4. This ON operation is executed before the voltage at the gate of the drive element IGBT rises to the ON voltage level. Consequently, the gate voltage rising at the drive element IGBT is switched for dissipation, allowing the drive element IGBT to sustain the OFF state. Thus, an erroneous light emission is prevented.

Advantages of the First Embodiment

As explained above, the protective circuit 14 detects an anomalous state in which the collector voltage at the transistor Q1 is allowed to rise without an input of the light emission start signal TG in the first embodiment. The protective circuit 14 turns on the transistor Q4 upon detecting this anomalous state. As a result, the drive element IGBT is not turned on and power supply to the flash light emission circuit 13 is prevented. Thus, any concern for a breakdown of the drive element IGBT attributable to an unstable operation caused by an anomalous signal is eliminated.

In addition, since any erroneous light emission is prevented through the operation described above which is executed by the protective circuit 14, the operational reliability of the electronic flash device 11 is improved.

Furthermore, the speedup capacitor Cs is provided in parallel to the resistor R27 in the first embodiment. The speedup capacitor Cs hastens the timing with which the transistor Q4 is turned on/off. As a result, it becomes possible to turn on the transistor Q4 with an ample lead time before the gate voltage at the drive element IGBT reaches the ON voltage level. Consequently, the light emission start can be prevented with a high degree of reliability in a timely manner in the electronic flash device 11, before the light emission start circuit sequence starts in response to an anomalous signal.

Next, another embodiment is explained.

Second Embodiment

Figure 2:
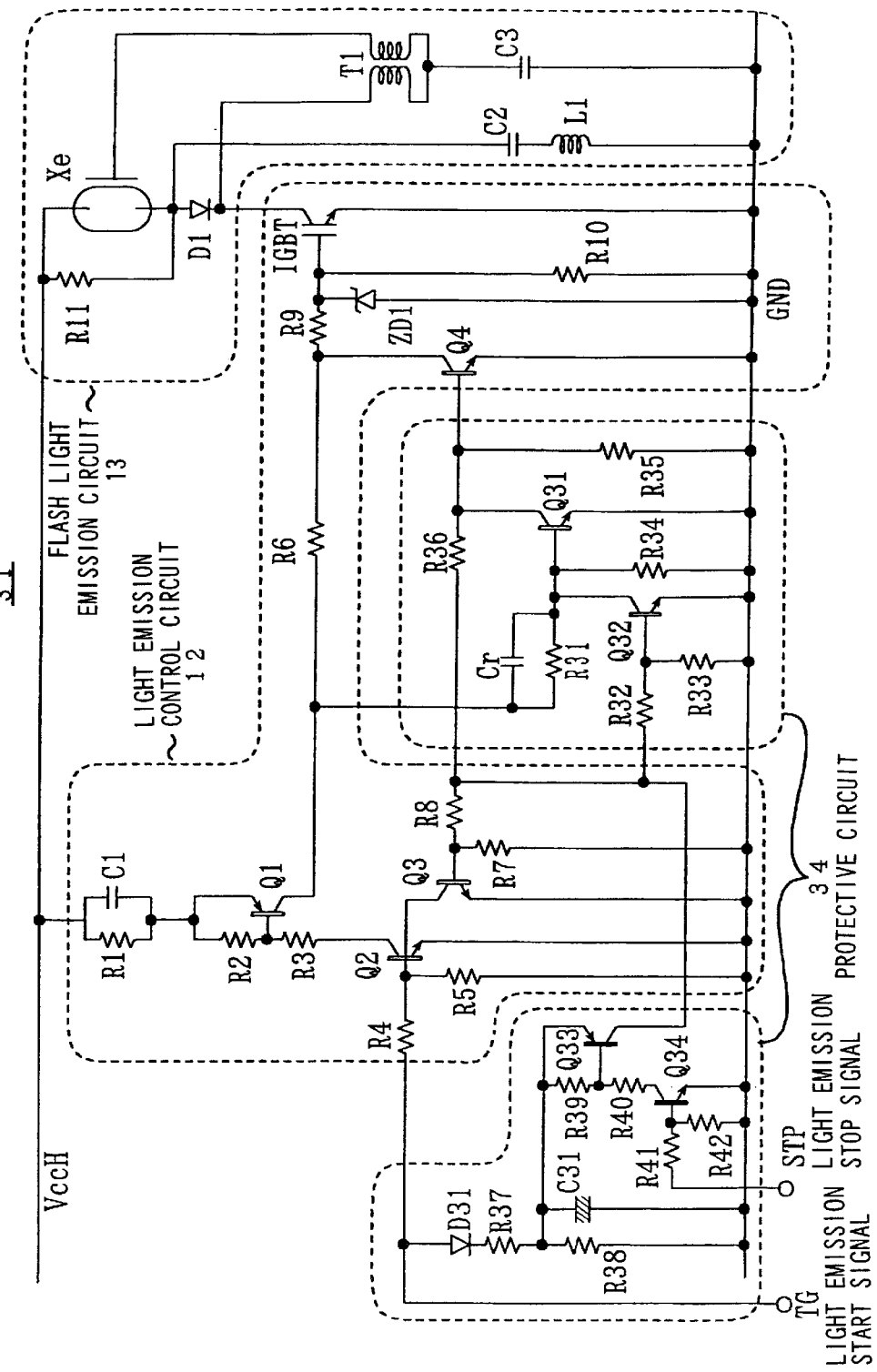
FIG. 2 illustrates the main circuits in the electronic flash device 31.
Figure 3:
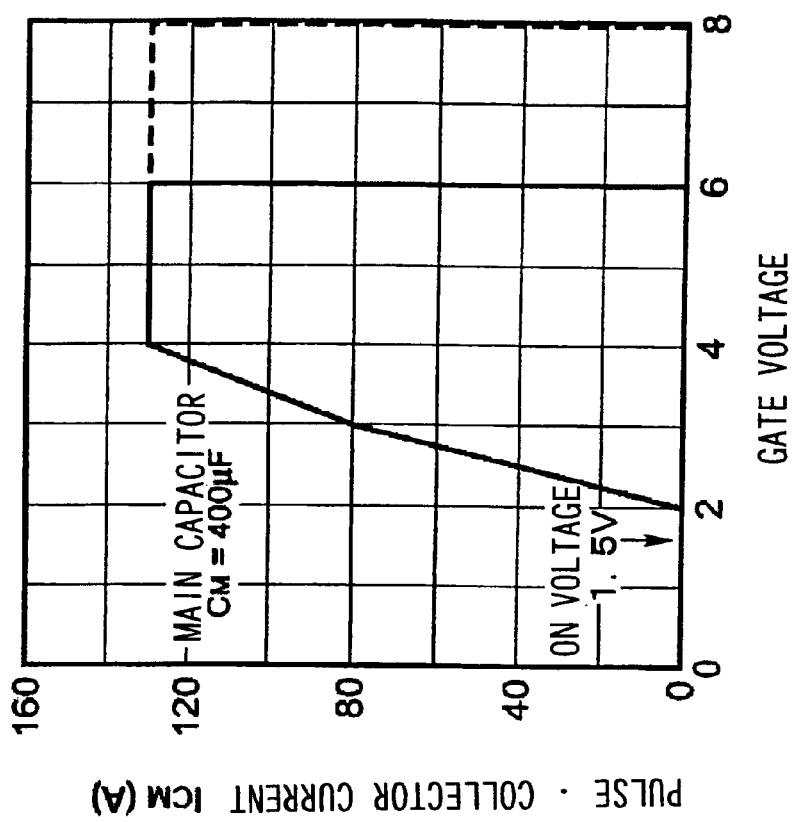
FIG. 3 shows the maximum rated value of an IGBT (insulated gate bipolar transistor).

FIG. 2 shows the main circuits in an electronic flash device 31. The electronic flash device 31 in FIG. 2 comprises a light emission control circuit 12, a flash light emission circuit 13 and a protective circuit 34.

The light emission control circuit 12 and the flash light emission circuit 13 both assume circuit structures identical to those in the first embodiment. The protective circuit 34, however, includes transistors Q31~Q34, a diode D31, resistors R31~R42, a speedup capacitor Cr and a capacitor C31.

Operation Performed Under Normal Circumstances

Now, the operation of the electronic flash device 31 performed under normal circumstances is explained. A light emission start signal TG input from a camera or the like is input to the light emission control circuit 12. In response to the light emission start signal TG, the light emission control circuit 12 executes a circuit sequence similar to that achieved in the first embodiment, thereby turning on the drive element IGBT. As the drive element IGBT is turned on, the flash light emission circuit 13 starts light emission at the light emitting tube Xe.

The light emission start signal TG is also input to the protective circuit 34. At the protective circuit 34, the light emission start signal TG is charged at the capacitor C31 via the diode D31 and the resistor R37. When a light emission stop signal STP is provided to the protective circuit 34 with normal timing, the voltage charged at the capacitor C31 is used as a source to sequentially turn on the transistors Q34 and Q33. Most of the charged voltage at the capacitor C31 is output to the collector of the transistor Q33. This collector voltage, in turn, turns on the transistor Q3 via the resistor R8. In response, the base voltage at the transistor Q2 is lowered to the level of the ground potential, thereby forcibly turning off the transistor Q2 and the transistor Q1.

The collector voltage at the transistor Q33 turns on the transistor Q32 via the resistor R32. As a result, the base voltage at the transistor Q31 is lowered to the level of the ground potential and the transistor Q31 is forcibly turned off. In this state, the collector voltage at the transistor Q33 is supplied to the base of the transistor Q4 via the resistor R36 without interference from the transistor Q31 which is in an OFF state. Consequently, the transistor Q4 is turned on and the gate voltage at the drive element IGBT is lowered to the level of the ground potential. The drive element IGBT is thus turned off, thereby stopping the flash light emission at the light emitting tube Xe.

Operation Performed Under Anomalous Circumstances

The operations performed in different anomalous situations are now individually explained.

Case 1

The circuit operation executed when 1) the transistor Q1 is turned on in response to an anomalous signal without an input of the light emission start signal TG and 2) the light emission stop signal STP is subsequently input, while there is no input of the light emission start signal TARGET, is now explained. In this situation, the drive element IGBT is turned on as the transistor Q1 becomes turned on, thereby allowing the light emitting tube Xe to start light emission.

Since there has been no input of the light emission start signal TG, the capacitor C31 on the protective circuit 34 has not been charged. For this reason, the transistors Q34 and Q33 are not turned on even if the light emission stop signal STP is input following the light emission start and thus, the circuit sequence for the light emission stop does not take place. As a result, the light emission stop following the light emission start is prevented and breakdown of the drive element IGBT is prevented in case 1.

Case 2

A situation in which a discharge pulse attributable to static electricity is applied sequentially to the transistor Q1 and the transistor Q4 with a slight time lag is explained. In such a case, the drive element IGBT is turned on as the transistor Q1 becomes turned on by the static electricity thereby allowing the light emitting tube Xe to start light emission.

Since there has been no input of the light emission stop signal STP, the transistor Q33 and the transistor Q32 on the protective circuit 34 sustain an OFF state. In this state, the protective circuit 34 promptly detects the collector voltage at the transistor Q1 via the speedup capacitor Cr and turns on the transistor Q31. As a result, the base of the transistor Q4 becomes promptly grounded by the transistor Q31.

Even if the discharge pulse attributable to the static electricity is applied to the base of the transistor Q4 in this state, the voltage at the base which is grounded does not rise and the transistor Q4 thus sustains the OFF state. Consequently, the light emission stop circuit sequence is not started up and a light emission stop immediately after the light emission start can be prevented with a high degree of reliability. As a result, breakdown of the drive element IGBT and the like can be prevented in case 2, as well.

Case 3

A brief explanation is now given on the circuit operation performed when the light emission stop signal STP is input immediately after an input of the light emission start signal TG. In this situation, the transistor Q1 and the drive element IGBT are turned on by the light emission start signal TG and thus, the light emitting tube Xe starts light emission.

Since the light emission start signal TG has just been encouraged, the capacitor C31 has not yet been fully charged on the protective circuit 34 immediately after the input of the light emission start signal TG. For this reason, the transistors Q34 and Q33 are not turned on even if the light emission stop signal STP is input immediately after the light emission start and the light emission stop circuit sequence is not started up. As a result, a light emission stop immediately after the light emission start is prevented to prevent a breakdown of the drive element IGBT in case 3, as well.

Advantages of the Second Embodiment

As explained above, the protective circuit 34 detects an anomalous state in which power is supplied to the flash light emission circuit 13 without an input of the light emission start signal TG in the second embodiment. Upon detecting such an anomalous state, the protective circuit 34 prevents a light emission stop operation. Thus, if the flash light emission circuit should start light emission without an input of the light emission start signal, the light emission is not immediately halted. As a result, a condition in which a light emission stop is induced immediately after the light emission start is avoided, thereby making it possible to prevent a breakdown of the drive element and the like.

In addition, since it is not necessary to prevent a light emission start when the operation described above is executed, the operating speed required for the protective circuit 34 is lower than that required in the first embodiment. Thus, another advantage is achieved in that the design of the protective circuit 34 is facilitated. Furthermore, since it is not necessary to prevent a light emission start, the drive element IGBT can be protected with a high degree of reliability even when the operational timing makes it difficult to prevent a light emission start.

Moreover, the speedup capacitor Cr is provided between the collector of the transistor Q1 and the base of the transistor Q31 in the second embodiment. This speedup capacitor Cr hastens the timing with which the transistor Q31 is turned on/off. Consequently, it is possible to suppress an increase in the base voltage at the transistor Q4 attributable to static electricity or the like in a timely manner.

The above described embodiments are examples, and various modifications can be made without departing from the spirit and scope of the invention.

What is claimed is:

1. An electronic flash device comprising:
   a flash light emission circuit that performs a flash light emission;
   a light emission control circuit that supplies power for light emission to the flash light emission circuit in response to an input of a light emission start signal and cuts off the power to the flash light emission circuit in response to an input of a light emission stop signal; and
   a protective circuit that detects a state that will induce power supply to the flash light emission circuit in response to an anomalous signal based upon a circuit operation of the light emission control circuit and prevents the power supply to the flash light emission circuit.

2. An electronic flash device comprising:
   a flash light emission circuit that performs a flash light emission;
   a light emission control circuit that supplies power for light emission to the flash light emission circuit in response to an input of a light emission start signal and cuts off the power to the flash light emission circuit in responses to an input of a light emission stop signal; and
   a protective circuit that detects a state that will induce power supply to the flash light emission circuit without an input of the light emission start signal based upon a circuit operation of the light emission control circuit and prevents the power supply to the flash light emission circuit.

3. An electronic flash device according to claim 2, wherein:
   the light emission control circuit includes at least a first switching element that turns on/off the power supply to the flash light emission circuit, a second switching element that outputs an ON signal for turning on the first switching element in response to an input of the light emission start signal and a third switching element that outputs an OFF signal for turning off the first switching element in response to the light emission stop signal; and
   the protective circuit prevents t he first switching element from becoming turned on in response to the ON signal if the ON signal from the second switching element is detected while the re is no input of the light emission start signal.

4. An electronic flash device comprising:
   a flash light emission circuit that performs a flash light emission;
   a light emission control circuit that supplies power for light emission to the flash light emission circuit in response to an input of a light emission start signal and cuts off the power to the flash light emission circuit in response to an input of a light emission stop signal; and
   a protective circuit that detects a state that induces power supply to the flash light emission circuit in response to an anomalous signal based upon a circuit operation of the light emission control circuit and prevents a power supply cutoff to the flash light emission circuit.

5. An electronic flash device comprising:
   a flash light emission circuit that performs a flash light emission;
   a light emission control circuit that supplies power for light emission to the flash light emission circuit in response to an input of a light emission start signal and cuts off the power to the flash light emission circuit in response to an input of a light emission stop signal; and
   a protective circuit that detects a state that induces power supply to the flash light emission circuit without an input of the light emission start signal based upon a circuit operation of the light emission control circuit and prevents cutoff of power supply to the flash light emission circuit.

6. An electronic flash device according to claim 5, wherein:
   the light emission control circuit includes at least a first switching element that turns on/off power supply to the flash light emission circuit and a second switching element that outputs an ON signal for turning on the first switching element in response to an input of the light emission start signal and outputs an OFF signal for turning off the first switching element in response to the light emission stop signal; and
   the protective circuit prevents the OFF signal from becoming output from the second switching element even if the light emission stop signal is input while the ON signal is output from the second switching element without an input of the light emission start signal.

7. An electronic flash device according to claim 6, wherein:
   the protective circuit includes a capacitor which is charged with the light emission start signal so as to detect an input of the light emission start signal.

8. An electronic flash device according to claim 5, wherein:
   the light emission control circuit includes at least a first switching element that turns on/off power supply to the flash light emission circuit and a second switching element that outputs an ON signal for turning on the first switching element in response to an input of the light emission start signal and outputs an OFF signal for turning off the first switching element in response to the light emission stop signal; and
   the protective circuit prevents the first switching element from becoming turned off if the ON signal from second switching element is detected while there is no input of the light emission start signal.

9. An electronic flash device according to claim 8, wherein:
   the light emission control circuit further includes a third switching element that turns off the first switching element regardless of whether the ON signal or the OFF signal is output from the second switching element when there has been an input of the light emission stop signal; and
   the protective circuit prevents the first switching element from becoming turned off by the third switching element regardless of whether or not there has been an input of the light emission stop signal if the ON signal is detected from the second switching element while there is no input of the light emission start signal.

10. An electronic flash device according to claim 8, wherein:

the protective circuit includes a capacitor which is charged with the light emission start signal so as to detect an input of the light emission start signal.

11. An electronic flash device according to claim 1, wherein:

the protective circuit includes a speedup capacitor for hastening timing with which power supply prevention is started.

12. An electronic flash device according to claim 2, wherein:

the protective circuit includes a speedup capacitor for hastening timing with which power supply prevention is started.

13. An electronic flash device according to claim 4, wherein:

the protective circuit includes a speedup capacitor for hastening timing with which power supply prevention is started.

14. An electronic flash device according to claim 5, wherein:

the protective circuit includes a speedup capacitor for hastening timing with which power supply prevention is started.

* * * * *